(12) United States Patent
Dempel et al.

(10) Patent No.: US 10,994,599 B1
(45) Date of Patent: May 4, 2021

(54) TRANSMISSION FOR A HYBRID DRIVE ARRANGEMENT, HYBRID DRIVE ARRANGEMENT, VEHICLE, METHOD FOR OPERATING THE HYBRID DRIVE ARRANGEMENT, COMPUTER PROGRAM AND STORAGE MEDIUM

(71) Applicant: Robert Bosch GmbH, Stuttgart (DE)

(72) Inventors: Rolf Lucius Dempel, Besigheim (DE); Dominik Eszterle, Heilbronn (DE); Thomas Huber, Daisbach (DE); Christian Wirth, Eichenried (DE); Simon Brummer, Gröbenzell (DE); Tom Smejkal, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/636,101

(22) PCT Filed: Jul. 31, 2018

(86) PCT No.: PCT/EP2018/070678
§ 371 (c)(1),
(2) Date: Feb. 3, 2020

(87) PCT Pub. No.: WO2019/025411
PCT Pub. Date: Feb. 7, 2019

(30) Foreign Application Priority Data

Aug. 2, 2017 (DE) ...................... 10 2017 213 344.9

(51) Int. Cl.
*B60K 6/365* (2007.10)
*B60K 6/547* (2007.10)
(Continued)

(52) U.S. Cl.
CPC .............. *B60K 6/365* (2013.01); *B60K 6/547* (2013.01); *B60K 6/48* (2013.01);
(Continued)

(58) Field of Classification Search
None
See application file for complete search history.

(56) References Cited

U.S. PATENT DOCUMENTS 8,287,431 B2 * 10/2012 Kobayashi ............ F16H 61/061
477/110
9,169,786 B2 * 10/2015 Miyazaki ................ F02D 13/02
(Continued)

FOREIGN PATENT DOCUMENTS

EP 3072724 9/2016
FR 3026062 3/2016
(Continued)

OTHER PUBLICATIONS

International Search Report for Application No. PCT/EP2018/070678 dated Nov. 2, 2018 (English Translation, 2 pages).

*Primary Examiner* — Dirk Wright
(74) *Attorney, Agent, or Firm* — Michael Best & Friedrich LLP

(57) ABSTRACT

The invention relates to a transmission (100) for a hybrid drive arrangement which can be coupled to two drive assemblies (7, 8), comprising an input shaft (10), and an output shaft (11), at least one first, second and third shifting element (SE1, SE2, SE3), at least one double planetary gear (5). The input shaft (10) can be coupled to the planet carrier of the double planetary gear (5) by means of the first shifting element (SE1), and the input shaft (10) can be coupled to the ring gear of the double planetary gear (5) by means of the second shifting element (SE2) and the input shaft (10) can be coupled to the first sun gear of the double planetary gear (5) by means of the third shifting element (SE3) and the output shaft (11) is coupled to the planet carrier of the double planetary gear (5).

13 Claims, 3 Drawing Sheets

(51) Int. Cl.
*B60K 6/48* (2007.10)
*F16H 3/72* (2006.01)

(52) U.S. Cl.
CPC ............... *B60K 2006/4816* (2013.01); *F16D 2500/70428* (2013.01); *F16H 3/725* (2013.01)

(56) References Cited

U.S. PATENT DOCUMENTS

| | | | | |
|---|---|---|---|---|
| 9,233,685 | B2 * | 1/2016 | Kanayama | ............ B60W 20/15 |
| 9,371,070 | B2 * | 6/2016 | Chinbe | ................ B60W 10/06 |
| 10,118,478 | B2 * | 11/2018 | Watanabe | ................. F16H 3/72 |
| 10,247,283 | B2 * | 4/2019 | Rihn | ........................ B60K 6/48 |
| 10,358,026 | B2 * | 7/2019 | Lecomte | ................ B60K 6/547 |

FOREIGN PATENT DOCUMENTS

| | | |
|---|---|---|
| GB | 995233 | 6/1965 |
| JP | 2006183760 | 7/2006 |
| WO | 2010009943 | 1/2010 |

\* cited by examiner

|  | SE1 | SE2 | SE3 | SE4 | SE5 | i |
|---|---|---|---|---|---|---|
| G1 |  |  | x | x |  | 12 |
| G2 |  |  | x |  | x | 6 |
| G3 | x |  | x |  |  | 3 |
| G4 |  | x |  |  | x | 2 |
|  |  |  |  |  |  |  |
| E1 |  |  |  | x |  | -12 |
| E2 |  |  |  |  | x | -6 |
| eCVT1 |  | x |  |  |  |  |
|  |  |  |  |  |  |  |
| CH1 |  |  | x |  |  |  |
|  |  |  |  |  |  |  |

TRANSMISSION FOR A HYBRID DRIVE ARRANGEMENT, HYBRID DRIVE ARRANGEMENT, VEHICLE, METHOD FOR OPERATING THE HYBRID DRIVE ARRANGEMENT, COMPUTER PROGRAM AND STORAGE MEDIUM

BACKGROUND OF THE INVENTION

The invention relates to a transmission for a hybrid drive arrangement. Furthermore, the invention relates to a hybrid drive arrangement having a transmission, to a vehicle having a hybrid drive arrangement, and to a method for operating the hybrid drive arrangement, and to a computer program and a machine-readable storage medium.

Transmissions for hybrid drive arrangements are known from the prior art. For example, WO2010/009943 A1 discloses a double clutch transmission which makes the operation of a hybrid vehicle possible by way of internal combustion engine, by way of electric motor, and by way of the two drive units together. Transmissions of this type are complex, heavy and expensive. There is a requirement for transmission topologies with a reduced mechanical complexity, a decreased installation space requirement and a reduced weight.

In the following text, the term "coupled" or "attached" is used in the sense of a fixed connection. In contrast to this, the term "can be coupled" comprises both fixed and switchable connections within the context of the present description. If a switchable connection is specifically meant, the corresponding shifting element is as a rule specified explicitly, in particular a brake or a clutch. If, in contrast, a fixed, rigid or non-rotating connection is specifically meant, the term "coupled" or "attached" is as a rule used and the use of the term "can be coupled" is dispensed with. The use of the term "can be coupled" without specification of a specific shifting element therefore indicates the intentional inclusion of the two types. This distinction takes place solely for the benefit of improved comprehensibility and, in particular, in order to clarify where the provision of a switchable connection instead of a fixed connection or coupling which can as a rule be realized more easily is absolutely necessary. The above definition of the term "coupled" or "attached" is therefore in no way to be interpreted to be so narrow that couplings which are inserted arbitrarily for bypassing purposes are derived from its literal sense.

SUMMARY OF THE INVENTION

A transmission for a hybrid drive arrangement is provided, which transmission can be coupled to two drive units, having an input shaft and an output shaft, at least a first, second and a third shifting element, and at least a double planetary transmission, in particular a Ravigneaux set, having a first and a second sun gear, a planetary carrier and an internal gear, it being possible for the input shaft to be coupled by means of the first shifting element to the planetary carrier of the double planetary transmission and it being possible for the input shaft to be coupled by means of the second shifting element to the internal gear of the double planetary transmission, and it being possible for the input shaft to be coupled by means of the third shifting element to the first sun gear of the double planetary transmission and the output shaft being coupled to the planetary carrier of the double planetary transmission.

A transmission for a hybrid drive arrangement is provided. For the operation of the hybrid drive arrangement, two drive units can be coupled to the transmission. The transmission comprises an input shaft and an output shaft, at least a first, second and a third shifting element, and at least a double planetary transmission, in particular a Ravigneaux set. The double planetary transmission comprises a first and a second sun gear, an (in particular, common) planetary carrier and an internal gear. In particular, the double planetary transmission comprises first planets which orbit the first sun gear and mesh with the first sun gear and with the internal gear. In particular, second planets orbit and mesh with the second sun gear, and mesh with the first planets. In particular, the planetary carrier fixes the spacings of the first and second planets from one another and in each case among one another. The output shaft is coupled to the planetary carrier of the double planetary transmission. Within the context of the description, a coupling is to be understood as being a connection which is configured rigidly, for example in one piece, for example by means of a shaft, or with a fixed transmission or transmission stage. The input shaft can be coupled by means of the first shifting element to the planetary carrier of the double planetary transmission. Furthermore, the input shaft can be coupled by means of the second shifting element to the internal gear of the double planetary transmission. Furthermore, the input shaft can be coupled by means of the third shifting element to the first sun gear of the double planetary transmission. In particular, the output shaft can be coupled to an output. An output is, in particular, at least one shaft or an axle which transmits the movement of the output shaft to the mechanical drive train of a vehicle, for example to a differential or to a drive wheel. A transmission is advantageously provided which transmits the rotational speed and the torque which prevails at the input shaft to the output shaft in accordance with the transmission ratios in the transmission in the case of a closed first and open second and third shifting element. In the case of an open first shifting element, the input shaft is decoupled from the output shaft.

In another refinement of the invention, the transmission comprises a fourth shifting element which is set up to brake or to release the internal gear of the double planetary transmission.

A fourth shifting element is provided for the transmission, which fourth shifting element makes releasing or braking of the internal gear of the double planetary transmission possible, in particular connecting of the internal gear of the double planetary transmission or supporting of the internal gear of the double planetary transmission on a fixed point or on a housing of the transmission. The braking of the internal gear of the double planetary transmission comprises the reduction of the rotational speed of the internal gear, in particular to a standstill of the internal gear. The releasing of the internal gear comprises the releasing of the brake, with the result that the internal gear accelerates in accordance with the forces which act on the internal gear. In addition to the abovementioned operating modes, further operating modes can advantageously be set by way of the above-described topology of the transmission with the first to fourth shifting elements. The highest possible transmission ratio which can be achieved with this transmission between the input shaft and the output shaft thus results in the case of a closed fourth and third shifting element and an open first and second shifting element.

In another refinement of the invention, the transmission comprises a fifth shifting element which is set up to brake or to release the second sun gear of the double planetary transmission.

A fifth shifting element is provided for the transmission which makes releasing or braking of the second sun gear of the double planetary transmission possible, in particular connecting of the second sun gear of the double planetary transmission or supporting of the second sun gear of the double planetary transmission on a fixed point or on a housing of the transmission. The braking of the second sun gear of the double planetary transmission comprises the reduction of the rotational speed of the second sun gear of the double planetary transmission, in particular as far as the standstill of the second sun gear of the double planetary transmission. The releasing of the second sun gear of the double planetary transmission comprises the disengaging of the brake, with the result that the second sun gear of the double planetary transmission accelerates in accordance with the forces which act on the second sun gear of the double planetary transmission. In addition to the abovementioned operating modes, further operating modes can advantageously be set with the above-described topology of the transmission by way of the first to fifth shifting elements. A second highest or a lowest transmission ratio which can be achieved with this transmission between input shaft and output shaft thus results in particular in the case of a closed fifth and third or second shifting element.

In a further refinement of the invention, the first shifting element comprises a clutch.

In order to connect the input shaft to the planetary carrier of the double planetary transmission, the first shifting element is configured as a clutch. A clutch of this type can be, in particular, a dry clutch, a wet clutch or a claw coupling. Possibilities for a controllable connection of the input shaft to the planetary carrier are advantageously provided.

In another refinement of the invention, the second and/or third shifting element comprise/comprises a claw coupling.

The second and/or the third shifting element are/is configured as a claw coupling. The second and third shifting element are either open or are closed in an alternating manner, that is to say are never closed simultaneously. Therefore, said two shifting elements can advantageously be actuated by means of an actuator and a selector fork or selector rocker. To this end, the actuator actuates, in particular, three positions: second shifting element closed; both shifting elements open; third shifting element closed. A possibility for controllably coupling the input shaft to the components of the double planetary transmission is advantageously provided.

In another refinement of the invention, the fourth and/or the fifth shifting element comprises a brake.

The fourth and/or the fifth shifting element are/is configured as a brake, in particular as a dry brake or wet brake or as a claw coupling which in particular is configured as a brake. A possibility for controllably releasing and braking the components of the double planetary transmission is advantageously provided.

In another refinement of the invention, a first drive unit, in particular an internal combustion engine, can be coupled to the input shaft, and/or a second drive unit, in particular an electric machine, can be coupled to the first sun gear of the double planetary transmission.

The first drive unit can be attached on the input shaft on the input side. The second drive unit can be coupled to the first sun gear of the double planetary transmission. For generator operation of the second drive unit, for example an electric machine, for example in order to charge a battery, the first drive unit or the internal combustion engine can advantageously be connected to the electric machine by means of closing of the third shifting element and opening of the first, second and fourth and fifth shifting element. Since the two drive units are decoupled here from the output shaft and therefore no torque is transmitted to the output shaft, said charging can take place in the case of an output shaft which is at a standstill, for example, that is to say, for example, during the standstill of a vehicle (standstill charging). In the case of an output shaft which is, for example, at a standstill, a direct transmission of the rotational energy of the first drive unit to the second drive unit or vice versa is made possible, for example in order to start an internal combustion engine.

Power-split operation of the transmission (eCVT mode) is made possible by way of closing of the second shifting element and opening of the first, third, fourth and fifth shifting element. Here, the first drive unit acts on the internal gear of the double planetary transmission and the electric machine acts on the first sun gear of the double planetary transmission, the planetary carrier of which is connected to the output shaft. Here, the transmission ratio between the input shaft and the output shaft can be varied continuously over a wide range by means of specification of a rotational speed or a torque of the second drive unit. Power-split operation (also called eCVT1 mode) is advantageously made possible, in the case of which both the propulsion power at the output shaft and the charging power for the generator operation of the electric machine can be set independently of one another. Charging at a standstill or in crawling mode (>0 km/h to approximately 10 km/h) and a smooth comfortable transition from the standstill charging mode into the crawling charging mode and the driving mode is advantageously made possible with a fixed transmission, that is to say in a fixed gear.

In the case of a closed fourth or fifth shifting element, the second drive unit is connected in each case via a fixed transmission to the output shaft, with the result that driving of the output shaft takes place only by means of the second drive unit in the case of a fixed transmission in each case.

There is also the possibility that the first drive unit is configured, for example, as an electric machine, and the second drive unit is configured, for example, as an internal combustion engine. In a configuration of this type, different functionalities and operating modes for the interaction of the components can result by means of the transmission, which are not described further here.

In another refinement of the invention, the transmission ratios of the transmission are changed without the traction force being interrupted.

Changing of the transmission ratios of the transmission, in particular shifting into another gear or into another operating mode of the transmission, takes place without the traction force being interrupted if, in particular, for the change from one operating mode of the transmission into another, one of the shifting elements retains its state, a second one of the shifting elements is transferred from a closed state into an open state, and a third one of the shifting elements is transferred from an open state into a closed state. A transmission is advantageously provided, in the case of which changing of the gear stages without an interruption of the traction force is made possible.

In another refinement of the invention, the transmission comprises an actuator for actuating at least one of the shifting elements in a manner which is dependent on a predefined operating specification signal.

An actuator is provided which actuates at least one of the shifting elements in a manner which is dependent on a predefined operating specification signal, for example a requested torque, a predefined rotational speed, or a defined operating point of the drive unit. Said parameters of the operating specification signal can be related to the output shaft of the transmission, to the input shaft, or to the shafts which are to be connected to the drive units. Control of the transmission is advantageously made possible.

Furthermore, the invention relates to a hybrid drive arrangement having a transmission, the hybrid drive arrangement comprising a second drive assembly and/or a pulse inverter, an electric energy source or a first drive unit.

A hybrid drive arrangement having an above-described transmission is provided. The hybrid drive arrangement comprises a second drive assembly. In particular, the hybrid drive arrangement comprises a pulse inverter, an electric energy source and/or a first drive unit. The second drive unit is coupled or connected, in particular, to the first sun gear of the double planetary transmission. The pulse inverter is provided, in particular, for supplying the second drive unit, in particular an electric machine. To this end, in particular, it converts the electric energy of an electric energy source, for example a battery and/or a fuel cell. The first drive unit is coupled or connected, in particular, to the input shaft. A hybrid drive arrangement which is set up for use in a vehicle is advantageously provided.

Furthermore, the invention comprises a vehicle having a described hybrid drive arrangement. A vehicle which comprises a hybrid drive arrangement is advantageously provided.

Furthermore, the invention comprises a method for operating a hybrid drive arrangement having a transmission. The method comprises the following steps:

determining of an operating specification signal;
actuating of at least one of the shifting elements in order to set the functionality of the transmission in a manner which is dependent on the operating specification signal (BV).

A method for operating a hybrid drive arrangement having a transmission is provided. Here, an operating specification signal is determined. At least one of the shifting elements is closed or opened in order to set the functionality of the transmission or of a corresponding operating mode in a manner which is dependent on the operating specification signal. The operating specification signal is predefined in a manner which is dependent on an operating strategy, a driver request or accelerator pedal, a battery management system or other systems which are available, for example, in a vehicle. In a manner which is dependent on said operating specification signal, the shifting elements are actuated in order to set the corresponding functionality or the operating mode of the transmission, in particular the clutches or brakes are closed or opened. The functionality of the transmission or the operating mode are, in particular, the different transmission ratios of the various gear stages, or the various modes or operating modes, for example generator operation of the second drive unit in the case of a stationary output shaft or the eCVT mode. A method for operating a hybrid drive arrangement is advantageously provided.

Furthermore, the invention relates to a computer program which is set up to carry out the described method.

Furthermore, the invention relates to a machine-readable storage medium, on which the described computer program is stored.

It goes without saying that the features, properties and advantages of the transmission relate and/or can be applied accordingly to the hybrid drive arrangement, the vehicle and/or the method, and vice versa. Further features and advantages of embodiments of the invention result from the following description with reference to the appended drawings.

BRIEF DESCRIPTION OF THE DRAWINGS

In the following text, the invention is to be described in greater detail on the basis of some figures, in which.

DETAILED DESCRIPTION

Figure 1:
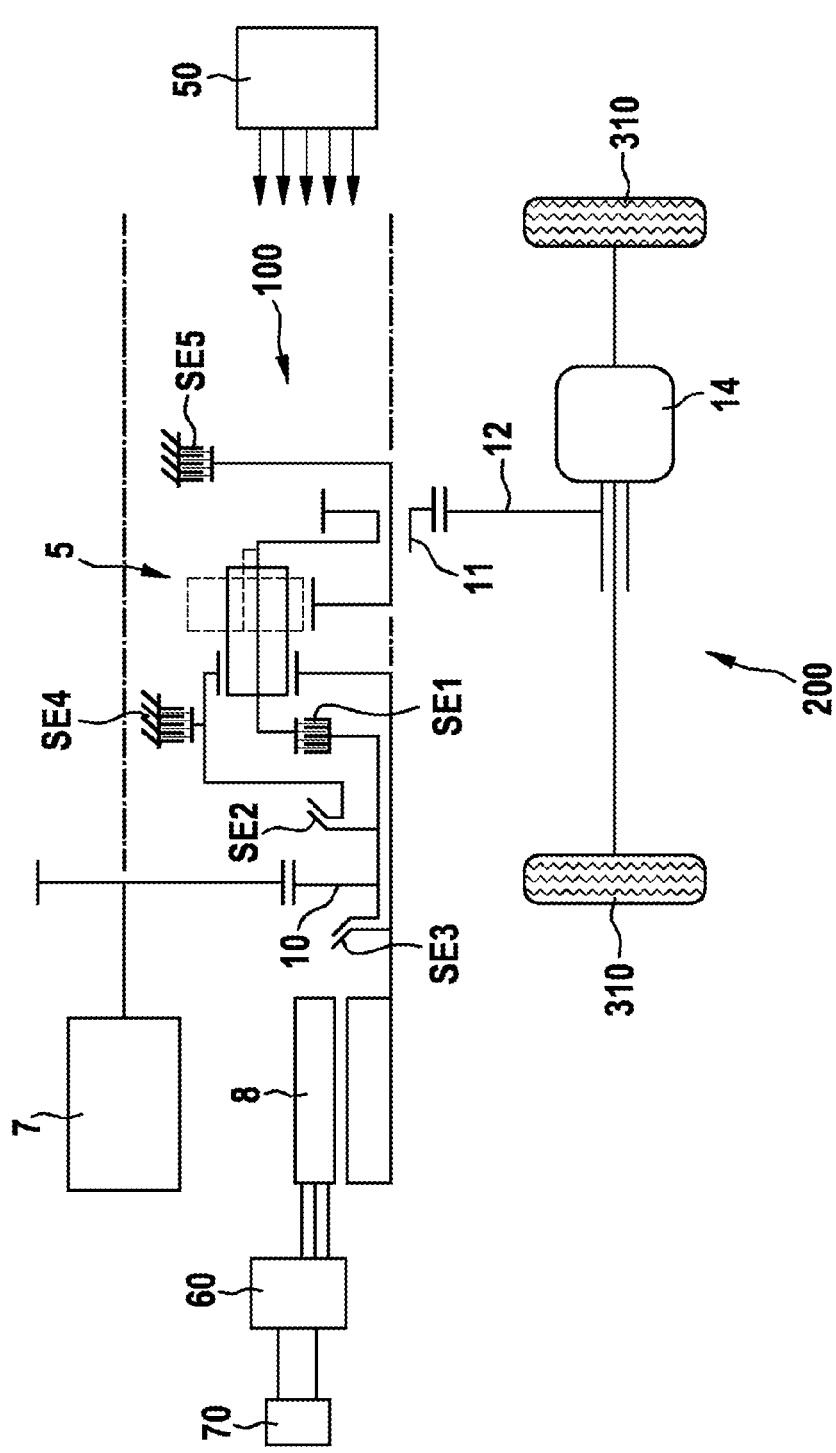
FIG. 1 shows a diagrammatic illustration of the hybrid drive train arrangement having a transmission.

FIG. 1 shows a hybrid drive train arrangement 200 having a first drive unit 7, in particular an internal combustion engine, and a second drive unit 8, in particular an electric machine, and a transmission 100. In particular, the hybrid drive train arrangement comprises a pulse inverter 60 for supplying the second drive unit 8 with electric energy. Furthermore, the hybrid drive train arrangement 200 comprises, in particular, an electric energy source 70 which is connected to the pulse inverter 60. The transmission 100 comprises the input shaft 10 and the output shaft 11. Furthermore, the transmission 100 comprises a double planetary transmission 5, in particular a Ravigneaux set, having a first and a second sun gear, an (in particular, common) planetary carrier and an internal gear. In particular, the double planetary transmission comprises first planets which orbit the first sun gear and mesh with the first sun gear and with the internal gear. In particular, second planets orbit and mesh with the second sun gear, and mesh with the first planets. In particular, the planetary carrier fixes the spacings of the first and second planets from one another and in each case among one another. Furthermore, the transmission 100 comprises five shifting elements SE1 . . . SE5. The first shifting element SE1, in particular a clutch, is set up to connect or to disconnect the input shaft 10 to/from the planetary carrier of the double planetary transmission 5. The second shifting element SE2, in particular a claw coupling, is set up to connect or to disconnect the input shaft 10 to/from the internal gear of the double planetary transmission 5. The third shifting element SE3, in particular a claw coupling, is set up to connect or to disconnect the input shaft 10 to/from the first sun gear of the double planetary transmission 5. Furthermore, the transmission 100 can have a fourth shifting element SE4. The fourth shifting element SE4, in particular a brake, is set up to brake or to release the internal gear of the double planetary transmission 5, in particular by the brake connecting the internal gear to a fixed point or, for example, supporting it on the housing (not shown) of the transmission 100. Furthermore, the transmission 100 can comprise a fifth shifting element SE5. The fifth shifting element SE5, in particular a brake, is set up to brake or to release the second sun gear of the double planetary transmission (5), in particular by the brake connecting the second sun gear to a fixed point or, for example, supporting it on the housing (not shown) of the transmission 100. Furthermore, the transmission is set up to be coupled or connected to a first drive unit via the input shaft 10 for operation. To this end, FIG. 1 shows that the shaft of the drive unit 7 is connected to the input shaft 10, in particular via a spur gear set. The second drive unit 8, in particular an electric machine, is connected to the first sun gear of the double planetary transmission 5 for the operation of the transmission 100, as shown in FIG. 1. For an optimization of the transmission ratios, the output shaft 11 is connected, for example, to a differential 14, for example via an output 12, in particular a spur gear set, via which differential 14 the movements are transmitted to the wheels 310. An actuator 50 is provided for actuating the shifting elements, which actuator 50 carries out the method for operating the hybrid drive arrangement having the transmission. The control lines between the actuator 50 and the individual shifting elements SE1 . . . SE5 are indicated only as an arrow and are not fully illustrated for reasons of clarity. The communication between the shifting elements SE1 . . . SE5 and the apparatus can take place by means of the control lines but also by means of a bus system or in a wireless manner.

Figures 2, 3:
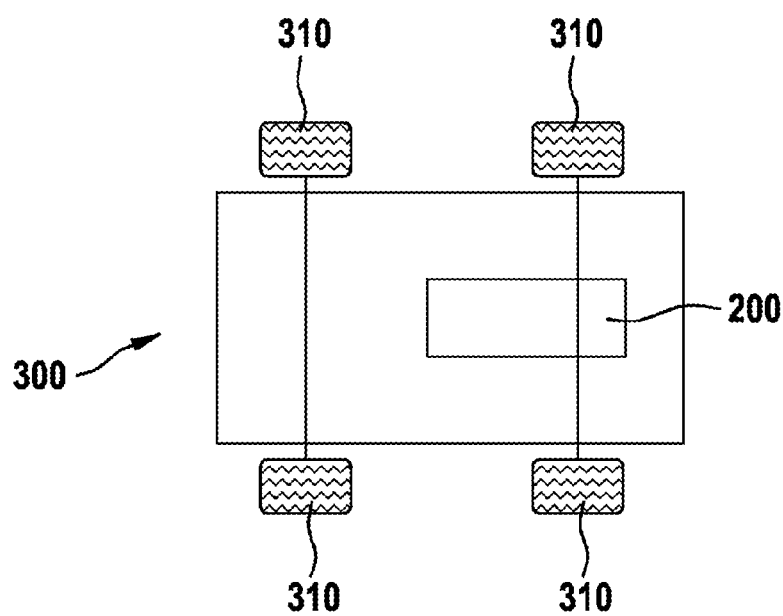
FIG. 2 shows a shifting matrix of the transmission.
FIG. 3 shows a diagrammatically illustrated vehicle having a hybrid drive train arrangement.

FIG. 2 shows a shifting matrix of the transmission. The individual shifting elements SE1 . . . SE5 are indicated in the columns, and an approximate transmission ratio which results between one of the drive units and the output shaft is shown in the last column by way of example. The different gear stages, gears or operating modes of the transmission are indicated in the rows. Crosses in the shifting matrix show which of the shifting elements have to be activated, in order that the corresponding gear or operating mode is set. Here, activation of the shifting elements means, in particular, that a clutch is closed or a brake is actuated, with the result that a force is transmitted via the clutch from one shaft to a further shaft or a force is transmitted by means of the brake to a fixed point, in particular the transmission housing. It can be seen from the shifting matrix that, depending on the combination of the five shifting elements, four gears G1 . . . G4 can be set, the first gear G1 having the highest transmission ratio and the fourth gear G4 having the lowest transmission ratio. In the case of the gears G1 . . . G4, there is preferably in each case a fixed rotational speed ratio between the first drive unit 7 and the output shaft 11 in accordance with the transmission given in the last column. The output shaft is driven in the gears G1 . . . G4 either by the first drive unit 7 alone or together with the second drive unit 8. In particular, these are internal combustion engine or hybrid gears, for example if the first drive unit 7 is an internal combustion engine and the second drive unit 8 is an electric machine. Said gears also make it possible to raise the load point of the internal combustion engine, with the result that the electric machine can be operated as a generator, and charging of a battery can take place during operation, in particular driving operation of a vehicle. The gears E1 and E2 or operating modes, in which only the second drive unit 8 is connected to the output shaft 11, are also shown in the following lines of the matrix. To this end, in particular, the first, second and the third shifting element SE1, SE2, SE3 has to be open, in order that there is no connection to the first drive unit 7. In particular, electric motor gears result in the case of a closed fourth or fifth shifting element, for example if the second drive unit is an electric machine. A vehicle can advantageously be operated locally without emissions in said gears. The transmission ratios which are specified in the shifting matrix between the second drive unit 8 and the output shaft 11 result by way of example in the case of closing of the fourth shifting element SE4 or the fifth shifting element SE5.

Closing of the second shifting element SE2 and opening of the remaining shifting elements SE1, SE3, SE4, SE5 results in power-split operation, the eCVT1 mode which makes a mutually independent propulsion power at the output shaft 11 and charging power of the second drive unit 8 possible. In particular, said operating mode is suitable for hybrid driving off in the case of a low battery charging state, since stepless changing of the transmission ratios and therefore, in particular, stepless acceleration are possible in the case of a simultaneous generator operation of the second drive unit 8.

A further mode CH1, also called standstill charging, results if the third shifting element SE3 is closed and the first, second, fourth and fifth shifting elements SE1, SE2, SE4, SE5 are open. Here, the drive units 7 and 8 are coupled to one another, there not being a connection to the output shaft 11. In said operating mode, the second drive unit 8 can be driven by means of the first drive unit 7 during the standstill of the output shaft, in particular of a vehicle, in particular can be used in the manner of a generator for charging an electric energy source 70, in particular a battery. As an alternative, the first drive unit 7 can also be driven by means of the second drive unit 8, and, for example, an internal combustion engine start or a diagnosis of the internal combustion engine can be carried out if the first drive unit 7 is an internal combustion engine and the second drive unit 8 is an electric machine.

FIG. 3 shows a vehicle 300 with wheels 310, the vehicle comprising a hybrid drive arrangement 200, as described above.

Figure 4:
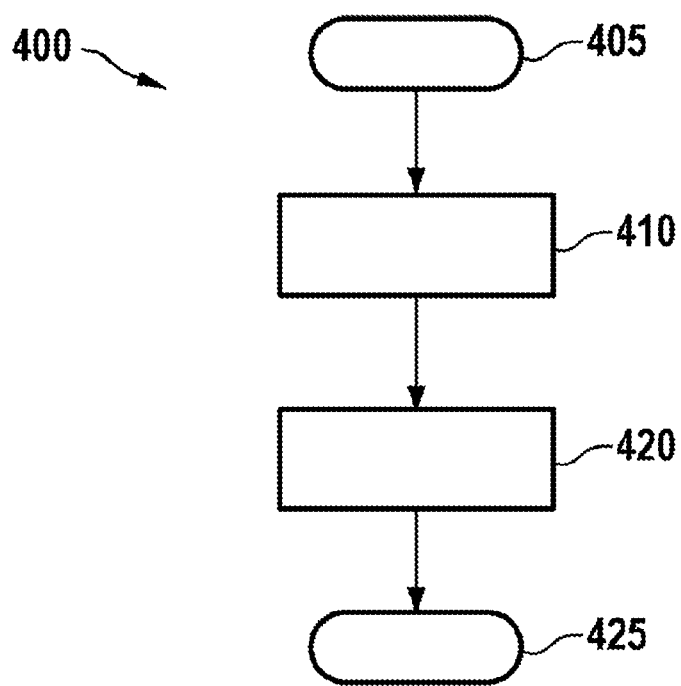
FIG. 4 shows a diagrammatically illustrated method for operating a hybrid drive train arrangement.

FIG. 4 shows a flow chart of a method 400 for operating a hybrid drive arrangement 200 having a transmission 100. The method starts with step 405. In step 410, an operating specification signal BV is determined and, in step 420, at least one of the shifting elements SE1 . . . SE5 is actuated in order to set the functionality of the transmission 100 in a manner which is dependent on the operating specification signal BV. The method ends with step 425. Here, the operating specification signal BV is either a parameter for a physical variable in the transmission 100, such as a torque or a rotational speed or a power output to be transmitted which is to prevail at or to be transmitted to a component of the transmission 100. Said components are, in particular, the input shaft 10, the output shaft 11, but also the parameters at the drive units 7, 8 or the shifting elements SE1 . . . SE5. Moreover, the operating specification signal BV can also represent a defined operating mode such as one of the four gears G1 . . . G4 or the two gears E1 . . . E2 which are operated only by way of the second drive unit, or else can represent the special functions eCVT1 or standstill charging CH1. In a manner which is dependent on said operating specification signal BV, the shifting elements SE1 to SE5 are actuated in accordance with the shifting matrix, in order to shift the transmission 100 into the corresponding gear or operating mode. For a shift between the individual gears or operating modes with no interruption of the tractive force, it is necessary that one of the shifting elements SE1 . . . SE5 retains its state before and after the shifting operation, a further shifting element moving during the shifting from the open into the closed state, whereas another shifting element moves from the closed into the open state.

The invention claimed is:

1. A transmission (100) for a hybrid drive arrangement, transmission (100) configured to be coupled to two drive units (7, 8), the transmission comprising:
    an input shaft (10) and an output shaft (11),
    at least a first, second and a third shifting element (SE1, SE2, SE3), and
    at least a double planetary transmission (5) having a first and a second sun gear, a planetary carrier and an internal gear,
the transmission further configured to
    couple the input shaft (10) via the first shifting element (SE1) to the planetary carrier of the double planetary transmission (5), and
    couple the input shaft (10) via the second shifting element (SE2) to the internal gear of the double planetary transmission (5), and couple the input shaft (10) via the third shifting element (SE3) to the first sun gear of the double planetary transmission (5), and couple the output shaft (11) to the planetary carrier of the double planetary transmission (5).

2. The transmission as claimed in claim 1, further comprising a fourth shifting element (SE4) configured to brake the internal gear of the double planetary transmission (5).

3. The transmission as claimed in claim 2, further comprising a fifth shifting element (SE5) configured to brake the second sun gear of the double planetary transmission (5).

4. The transmission as claimed in claim 1, wherein the first shifting element (SE1) comprises a slipping clutch.

5. The transmission as claimed in claim 1, wherein the second, the third, or both the first and second shifting elements (SE2, SE3) comprise a claw coupling.

6. The transmission as claimed in claim 2, wherein the fourth, the fifth, or both the fourth and fifth shifting elements (SE4, SE5) comprise a brake.

7. The transmission as claimed in claim 1, further configured to couple an internal combustion engine to the input shaft (10), and to couple an electric machine to the first sun gear of the double planetary transmission (5).

8. The transmission as claimed in claim 1, the transmission further configured to change transmission ratios of the transmission (100) traction force being interrupted.

9. The transmission as claimed in claim 1, further comprising an actuator (50) for actuating at least one of the shifting elements (SE1 . . . SE5) in a manner which is dependent on a predefined operating specification signal (BV).

10. A hybrid drive arrangement (200) having a transmission (100) as claimed in claim 1, the hybrid drive arrangement comprising a second drive unit (8) and/or a pulse inverter (60), an electric energy source (70) or a first drive unit (7).

11. A vehicle (300) having a hybrid drive arrangement (200) as claimed in claim 10.

12. A method (400) for operating a hybrid drive arrangement (200) having a transmission (100) having, an input shaft (10) and an output shaft (11), at least a first, second and a third shifting element (SE1, SE2, SE3), and at least a double planetary transmission (5) having a first and a second sun gear, a planetary carrier and an internal gear, the transmission further configured to couple the input shaft (10) via the first shifting element (SE1) to the planetary carrier of the double planetary transmission (5), and couple the input shaft (10) via the second shifting element (SE2) to the internal gear of the double planetary transmission (5), and couple the input shaft (10) via the third shifting element (SE3) to the first sun gear of the double planetary transmission (5), and couple the output shaft (11) to the planetary carrier of the double planetary transmission (5), the method comprising:

determining (410) an operating specification signal (BV); and actuating (420) at least one of the shifting elements (SE1 . . . SE5) in order to set the functionality of the transmission (100) in a manner which is dependent on the operating specification signal (BV).

13. A non-transitory, computer-readable storage medium containing program instructions that when executed by a computer cause the computer to control a transmission having an input shaft (10) and an output shaft (11), at least a first, second and a third shifting element (SE1, SE2, SE3), and at least a double planetary transmission (5) having a first and a second sun gear, a planetary carrier and an internal gear, the transmission further configured to couple the input shaft (10) via the first shifting element (SE1) to the planetary carrier of the double planetary transmission (5), and couple the input shaft (10) via the second shifting element (SE2) to the internal gear of the double planetary transmission (5), and couple the input shaft (10) via the third shifting element (SE3) to the first sun gear of the double planetary transmission (5), and couple the output shaft (11) to the planetary carrier of the double planetary transmission (5), to determine (410) an operating specification signal (BV); and actuate (420) at least one of the shifting elements (SE1 . . . SE5) in order to set the functionality of the transmission (100) in a manner which is dependent on the operating specification signal (BV).

* * * * *